US007890525B2

(12) United States Patent
Lu et al.

(10) Patent No.: US 7,890,525 B2
(45) Date of Patent: Feb. 15, 2011

(54) FOREIGN LANGUAGE ABBREVIATION TRANSLATION IN AN INSTANT MESSAGING SYSTEM

(75) Inventors: Fang Lu, Billerica, MA (US); Corey S. McCaffrey, Boston, MA (US); Elaine I. Kuo, North Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 11/939,616

(22) Filed: Nov. 14, 2007

(65) Prior Publication Data

US 2009/0125477 A1    May 14, 2009

(51) Int. Cl.
  *G06F 7/00*  (2006.01)
  *G06F 17/30* (2006.01)
  *G06F 15/16* (2006.01)
(52) U.S. Cl. ...................................................... 707/763
(58) Field of Classification Search ................. 707/3–5, 707/736, 999.03; 709/202–207; 704/3–10
See application file for complete search history.

(56) References Cited

U.S. PATENT DOCUMENTS 7,451,188 B2 * 11/2008 Cheung et al. .............. 709/206

2007/0143410 A1 * 6/2007 Kraft et al. ................. 709/206

* cited by examiner

*Primary Examiner*—Cam Y Truong
*Assistant Examiner*—Cecile Vo
(74) *Attorney, Agent, or Firm*—David A. Dagg

(57) ABSTRACT

A system for automatically providing foreign language abbreviation translation in an instant messaging system that identifies a foreign language abbreviation translation database based on a user indicated source culture. The foreign abbreviation translation database stores abbreviation translations for foreign language abbreviations frequently used by people from the user indicated source culture. The system locates a candidate term in an instant message and compares the candidate term to the foreign language abbreviations in the foreign language abbreviation translation database. In the event that the candidate term matches one of the foreign language abbreviations in the identified foreign language abbreviation translation database, the corresponding translation is retrieved and displayed. The comparison of the candidate term with the foreign language abbreviations may include automatically obtaining a transliteration of the candidate term. The disclosed system advantageously enables translation of foreign language abbreviations to be performed in real-time.

16 Claims, 6 Drawing Sheets

FOREIGN LANGUAGE ABBREVIATION TRANSLATION IN AN INSTANT MESSAGING SYSTEM

FIELD OF THE INVENTION

The disclosed system relates generally to instant messaging systems, and more specifically to a method and system for providing foreign language abbreviation translation for an instant messaging system.

BACKGROUND OF THE INVENTION

As it is generally known, existing instant messaging systems have the capability to translate text from one language to another almost instantaneously during instant messaging sessions. However, instant messaging participants using the same language in an instant messaging session, but originating from different cultures, tend to use different abbreviations during the session, and existing translation programs do not effectively translate such abbreviations between such users.

In addition, people who speak one language will at times mimic terms from another language directly, for example, using a similar sounding word or expression in their native language to represent a foreign term. For example, when native Chinese speakers wish to express the English term "bye bye" (e.g. at the end of an instant messaging session), they often type the term "88", since in Chinese the number eight is pronounced "Ba" (which sounds like "bye" to a Chinese speaker), and accordingly the number eighty-eight in Chinese when spoken sounds very similar to the English term "bye bye". Native Chinese speakers may also enter the characters "拜拜"at the end of an instant messaging system, which literally mean "to pay respect; worship; visit; salute", but which are pronounced "bai bai", and thus also sound like "bye bye". Similarly, when people want to express the phrase "it is cool" in Chinese, they use the abbreviation "酷",which is pronounced as "ku" in Chinese, even though the word "酷"does not mean "it is cool" at all.

Foreign language abbreviations and "sound alike" phonetic expressions are being used in instant messaging session more and more. However, in existing instant messaging systems, only standard translation is provided, and the abbreviated terms and/or phonetic expressions introduced from foreign languages are not accurately translated. Accordingly, using existing translation tools, the foreign abbreviation "88", or "拜拜",will not be accurately translated into "bye bye". Similarly, the foreign abbreviation "酷"will not be translated into "it is cool".

For example, an instant messaging session may be held between user A from the United States and user B from China. Towards the end of that instant messaging session, user B may type the numbers 88, with the intended meaning of "bye bye" in English (for which it is a "sound alike" phonetic expression). However, User A is likely to have no clue what 88 means, and the on-line dictionary won't be of any help.

In another example, a Quebecer user might forget that he or she is chatting with an American, and use the abbreviation MDR, which stands for "mort de rire", roughly translating to "dead laughing". Unless the American user is familiar with the Quebecer culture, he or she is not likely to infer that MDR stands for LOL (the common American abbreviation for "laughing out loud").

In both of the above examples, even if the instant messaging session is being translated in real-time using an existing language translator, existing translation dictionaries are not able to effectively translate common instant messaging abbreviations such as 88, MDR, and the like.

There is some existing technology for converting standard dictionary English to abbreviations. For example, using an existing text messaging service (e.g. provided from the Web site https://www.vtext.com/customer_site/jsp/messaging_lo.jsp), a user can have standard English converted to abbreviated English, as in the following example:

Original: Hi, how are you? This is a test of a text message translator.
Goodbye!
Converted: Hi, how R U? This is a test of a TXT MSG translator.
Goodbye!

In summary, existing technologies are available for translating between dictionary English and other languages' dictionaries, and for converting dictionary English to abbreviated English. However, a significant shortcoming of existing systems is that they cannot translate abbreviations in a foreign language ("foreign abbreviations") into standard English or abbreviated English.

SUMMARY OF THE INVENTION

To address the above described and other shortcomings of existing systems, a method and system are disclosed for providing foreign language abbreviation translation in an instant messaging system. In the disclosed system, a user interface is generated that inputs a source culture indicating a source language in which foreign language abbreviations are most likely to be used by a user. The source culture may then be used to determine which set of foreign language abbreviation translations are most likely to be used for that user during an instant messaging session. Such a configuration indication may be determined from individual users on a per session basis, or maintained as a configuration value across all instant messaging sessions for specific users. The selected source culture may then subsequently be used to determine which foreign language abbreviation database or library is to be checked to locate translations of foreign language abbreviations found in instant messages sent by that user. Alternatively, in another embodiment, the selected source culture may indicate the first foreign language abbreviation database to check, such that if no match is found, one or more other foreign language abbreviation databases are checked as well. In another embodiment, a single foreign language abbreviation language database is used to contain translations of abbreviations in multiple foreign languages.

When the user types in a new instant message to be added to a session, and indicates that the message is complete (e.g. by clicking "Send" or the like), the instant message is checked for foreign language abbreviations. The checking of a specific term in the message to determine whether it is a foreign language abbreviation may be performed in response to a trigger condition. For example, if a term in the message is in a foreign language, and not found in the basic electronic dictionary used to automatically translate terms in that foreign language, that determination may trigger a search of the foreign language abbreviation database for a match.

Determination of whether a term in the message matches a foreign abbreviation in the foreign abbreviation database may be based on direct character and/or text comparisons, and/or comparisons between the phonetic representation of the term and the terms to which it could be translated. For example, in an embodiment in which a phonetic representation is used to determine whether there is a match between a message term and a potential translation in the database, the phonetic representation of the message term is first determined automatically by generating a transliteration of the message term. In one embodiment, automatic transliteration is performed using an electronic PinYin translator capable of converting Chinese characters into their PinYin equivalents in the roman alphabet, and then comparing the result with possible terms to which it could be translated in the instant messaging session transcript to find a match. Alternatively, a digital sound wave or phonetic signature may be generated that represents the sound of the message term, and then a comparison made with sound waves or phonetic signatures stored for the possible terms to which it could be translated to find a match.

If a translation is found in the foreign abbreviation translation database for the identified message term, then the translation is provided in the instant messaging session transcript window either together with, or as a substitute for, the foreign abbreviation. For example, in one embodiment, the abbreviation translation is displayed in parenthesis next to the foreign abbreviation from which it was translated.

The foreign abbreviation translation database of the disclosed system may also be integrated into a regular translation database. In such an embodiment, when a foreign term is not found in the standard translation database, a translation engine then searches the foreign language abbreviation translation database for a match.

Thus there is disclosed a new method and system for providing foreign language abbreviation translation that may be embedded into an instant message system. When using the disclosed system, a user receives a quick interpretation of foreign abbreviations, e.g. efficiently performed based on the sender's cultural background as indicated by a user's preference or configuration value. Upon establishing an instant messaging session, the instant messaging clients may further exchange indications of cultural background indicating which foreign abbreviations are likely to be used by specific users, thus enabling the system (e.g. at the client or at the server) to efficiently translate the foreign abbreviations in real-time. The disclosed system advantageously enables translation of foreign language abbreviations to be performed in real-time, as quickly as originally entered messages can be transmitted.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
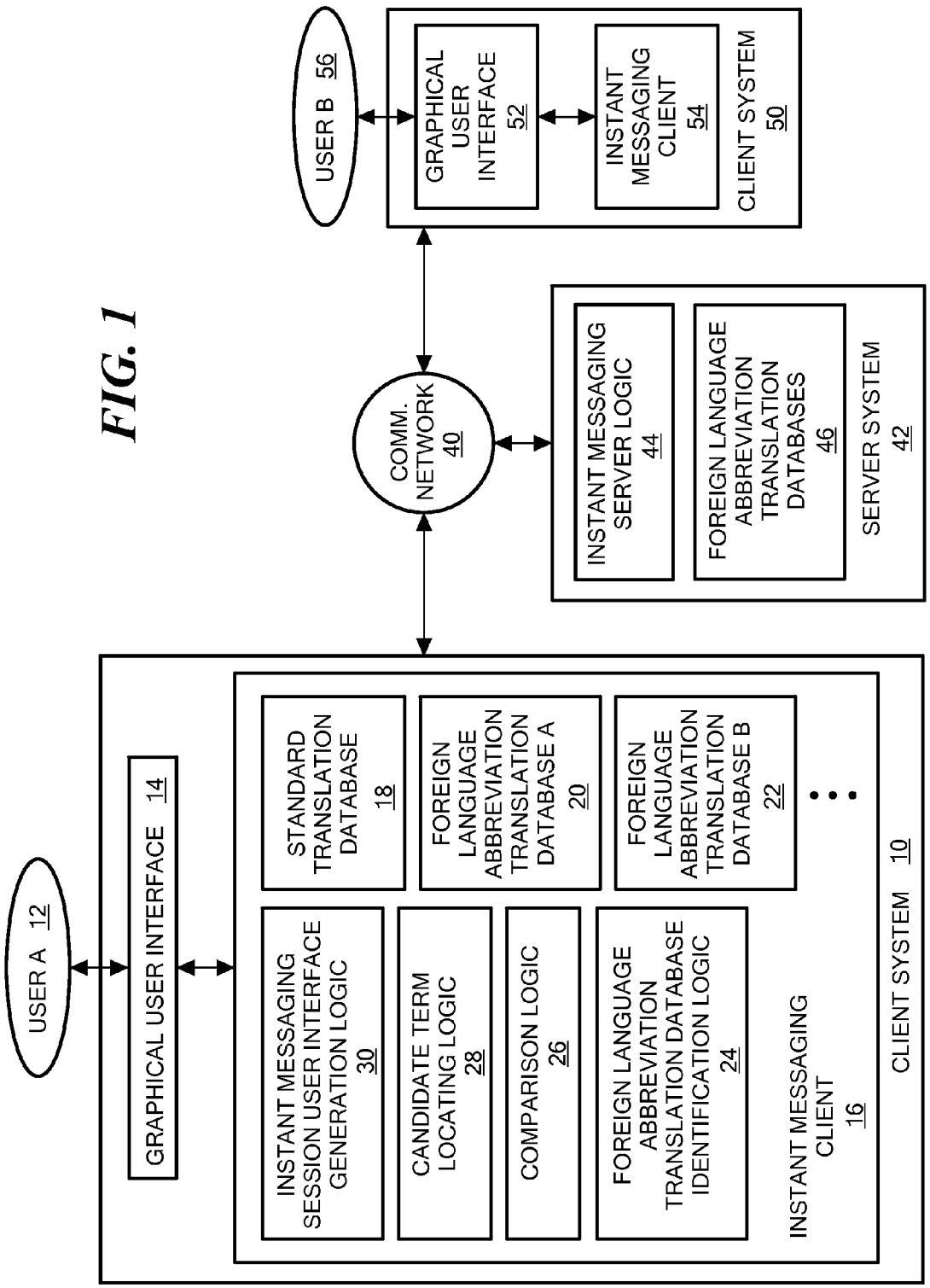
FIG. 1 is a block diagram showing hardware and software components in an illustrative embodiment.

FIG. 1 is a block diagram showing hardware and software components in an illustrative embodiment. As shown in FIG. 1, a Client System 10 includes an Instant Messaging Client 16 that generates a Graphical User Interface for User A 12. The Instant Messaging Client 16 includes Instant Messaging Session User Interface Generation Logic 30, Candidate Term Locating Logic 28, Comparison Logic 26, and Foreign Language Abbreviation Translation Database Identification Logic 24. The Instant Messaging Client 16 further includes a Standard Translation Database 18, and a number of Foreign Language Abbreviation Translation Databases, shown for purposes of illustration as including a first Foreign Language Abbreviation Translation Database A 20, a second Foreign Language Abbreviation Translation Database B 22, etc. The Client System 10 is communicably coupled to a Communication Network 40.

A Server System 42 is also communicably coupled to the Communication Network 40, and is shown including Instant Messaging Server Logic 44, and Foreign Language Abbreviation Translation Databases 46.

Further in FIG. 1, a Client System 50 is also shown communicably coupled to the Communication Network 40, and includes an Instant Messaging Client 54 that generates the Graphical User Interface 52 for User B 56.

During an example of operation of the components in the illustrative embodiment of FIG. 1, User A 12 initiates an instant messaging session with User B 56 through the Graphical User Interface 14. As it is generally known, an instant messaging session is a real-time, synchronous communication session between two or more participants, in which text messages are exchanged between the participants that are currently logged into an underlying instant messaging service (e.g. as provided by the Instant Messaging Server Logic 44). At the initiation of the instant messaging session, the Instant Messaging Session User Interface Generation Logic 30 creates a user interface object in the Graphical User Interface 14 that allows the User A 12 to indicate, select, or otherwise input a source culture indication. In one embodiment of the disclosed system, the source culture indication input from User A 12 is used to select and download a corresponding foreign language abbreviation translation database from the Foreign Language Abbreviation Translation Databases 46 onto the Client System 10 (e.g. using the Foreign Language Abbreviation Translation Database Identification Logic 24). For example, if the source culture indication input from User A 12 indicates that User A 12 is a native Chinese speaker, then a foreign language abbreviation translation database containing translations of foreign language abbreviations likely to be used by a native Chinese speaker is downloaded from the Foreign Language Abbreviation Translation Databases 46 onto the Client System 10, to be used to process instant messages generated by User A 12 during the instant messaging session between User A 12 and User B 56.

Alternatively, instead of determining a source culture indication for User A 12 on a per-session basis, the source culture indication for User A 12 may be captured once, and used for all instant messaging sessions of User A 12. Similarly, the appropriate foreign language abbreviation translation database(s) for User A 12 may be loaded once from Server System 42 to avoid having to re-load them for each instant messaging session. Moreover, in one embodiment, User A 12 is allowed to enter multiple source culture indicators, causing multiple corresponding foreign language abbreviation translation databases to be downloaded from the Server System 42.

During the instant messaging session between User A 12 and User B 56, when User A 12 composes an instant message to be added to the session, the Candidate Term Locating Logic 28 checks the message before it is added to the session transcript, in order to identify any terms that are foreign language abbreviations that should be translated. Such checking of a message by the Candidate Term Locating Logic 28 may, for example, include identifying any words or phrases in the message that are written in a foreign language (e.g. written using Chinese characters when the base or default language of the session is English), and/or simply treating each word or phrase in the message as a candidate term, regardless of what language the word or phrase is written in. In another embodiment, the disclosed system treats any foreign word or phrase for which a translation is not contained in the Standard Translation Database 18 as a candidate term. Alternatively, each foreign word or phrase in the message is initially treated as a candidate term, and compared to the contents of the entries or records in the foreign language abbreviation translation databases stored in the Client System 10, prior to comparison with the standard dictionary translations contained in the Standard Translation Database 18.

The foreign language abbreviation translation database(s) in the client system associates foreign language abbreviations frequently used by persons from the user indicated source culture with abbreviation translations in the language in which the instant messaging session is being held (e.g. English). Accordingly, a foreign language abbreviation translation database used to translate foreign language abbreviations associated with a source culture of Chinese to their English translations would associate the foreign language abbreviations "拜拜"and "酷"with the corresponding English abbreviation translations, e.g. "BIBI" or "BFN" and "KEWL" or "COOL" respectively.

In one embodiment, the Comparison Logic 26 operates to convert the candidate term to a transliteration of the candidate term during the comparison process. For example, the Comparison Logic 26 may include transliteration logic and data through which it can obtain a transliteration of the candidate term, and may then compare the resulting transliteration of the candidate term to the contents of the foreign language abbreviation translation database(s) loaded onto Client System 10. In the case of a Chinese language candidate term, the transliterative form of the candidate term may be obtained through an automatic conversion of the candidate term to its Pinyin equivalent. As it is generally known, Pinyin is a system for transliterating Chinese ideograms into the Roman alphabet. In such an embodiment, the automatically created transliteration of the candidate term may be compared directly with the abbreviation translations stored in the foreign language abbreviation translation database(s), and/or with phonetic representations of the abbreviation translations stored in the foreign language abbreviation translation database.

For example, in the case where the candidate term consists of the Chinese characters 拜拜,which literally mean "to pay respect; worship; visit; salute", the automatically determined transliteration of the candidate term would be "Bai Bai", which would be compared to a phonetic representation of the abbreviation translation "BIBI", which stands for "Bye Bye". Such a phonetic representation of the abbreviation BIBI might, for example, be "Bahy-Bahy". A comparison of the transliteration "Bai-Bai" and "Bahy-Bahy" may result in a determination that sufficient similarity exists between the two sounds to indicate a match, causing the disclosed system to translate 拜拜to BIBI.

In an alternative embodiment, the disclosed system automatically generates a digitized sound wave, phonetic signature or the like digitally representing the sound of the automatically generated transliteration of the candidate term, and compares that sound wave or phonetic signature with one or more previously stored sound waves or phonetic signatures for each of the abbreviation translations contained in the foreign language abbreviation translation database(s) stored on the Client System 10. If a match is found, then the disclosed system translates the candidate term to the corresponding abbreviation translation.

When the disclosed system translates a foreign language abbreviation for which an abbreviation translation is contained in the foreign language abbreviation translation database, the Instant Messaging Client retrieves the corresponding abbreviation translation from the foreign language abbreviation translation database, and causes the Instant Messaging Session User Interface Logic 30 to display the abbreviation translation in a session transcript display area of the instant messaging session user interface object displayed to User A 12 in the Graphical User Interface 14. For example, in one embodiment, the abbreviation translation is displayed within parenthesis adjacent to the foreign language abbreviation. Alternatively, the abbreviation translation may be displayed instead of the foreign language abbreviation. The abbreviation translation is similarly displayed to all participants in the instant messaging session, i.e. as part of the session transcript displayed in the session transcript display area of the instant messaging session user interface object for each participant (e.g. within the Graphical User Interface 52 generated by the Instant Messaging Client 54 for User B 56).

The Client Systems 10 and 12 of FIG. 1 may be any specific type of a computer system or intelligent electronic device, such as a desktop, laptop, or palmtop computer system, or a personal digital assistant, cell phone, or other electronic device. The Client Systems 10 and 12 each include or control a display devices capable of displaying a graphical user interface (e.g. including Graphical User Interface 14 and Graphical User Interface 52) to a local user (e.g. User A 12 and User B 56), such as a liquid crystal display (LCD), cathode ray tube (CRT), interferometric modulator display (IMOD), light emitting diode (LED), or the like.

Those skilled in the art will further recognize that the Instant Messaging Clients 16 and 54 and Instant Messaging Server Logic 44 of FIG. 1 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client Systems 10 and 12 and Server System 42 of FIG. 1 may each include one or more processors, and program storage, such as memory, for storing program code executable on such processors, as well as input/ output devices and/or interfaces. In the example of FIG. 1, the Client Systems 10 and 12 and Server System 42 are interconnected to a data communication network (e.g. Communication Network 40 such as the Internet, a Local Area Network, etc.) using one or more of such input/output devices or interfaces, and through which may further be provided communication to a number of other client systems and/or remote server systems.

Figure 2:
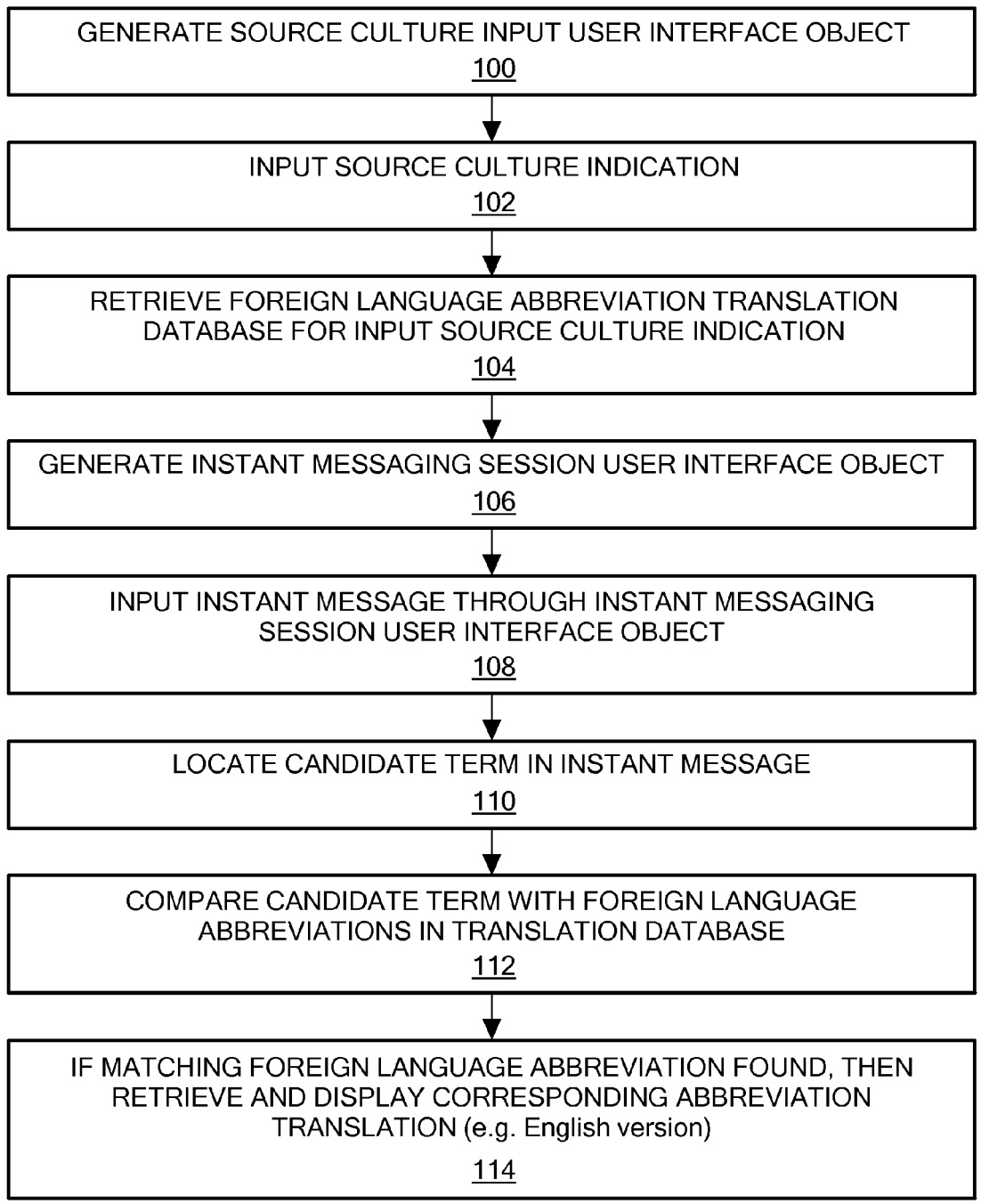
FIG. 2 is a flow chart showing steps performed during operation of an illustrative embodiment.

FIG. 2 is a flow chart showing steps performed during operation of an illustrative embodiment. As shown in FIG. 2, at step 100 the disclosed system generates a source culture input user interface object that allows a local user to indicate, select or enter a source culture to be used to determine which foreign language abbreviation translation database(s) is to be used to translate foreign language abbreviations entered by the user into instant messages in one or more instant messaging sessions. At step 102, the disclosed system receives the user indication of source culture through the user interface object generated at step 100. Based on the user indicated source culture, the disclosed system operates at step 104 to retrieve the appropriate foreign language abbreviation database(s).

At step 106, the disclosed system generates an instant messaging session user interface display object, e.g. including a message composition or entry field or region and a session transcript display area. An instant message is received ("input") by the disclosed system at step 108, for example through a message composition field in the instant messaging session user interface display object. The disclosed system checks the instant message for terms that may be foreign language abbreviations at step 110, locating at least one candidate term.

At step 112, the candidate term determined at step 110 is compared with foreign language abbreviations for which translations are available in a foreign language abbreviation translation database. If a match is found, then at step 114 the disclosed system retrieves and displays the corresponding abbreviation translation.

In an alternative embodiment, the determination of whether the candidate term matches one of the translations in the foreign language abbreviation translation database may be based at least in part on the context of the term within an instant message or session. For example, the disclosed system may detect that a term is on a line by itself, and use that information to help determine whether the term is a foreign language abbreviation to be translated. For example, if the term is "88" on a line by itself, then the disclosed system may determine that the term is the foreign language abbreviation "88" for "bye bye" or the like, and not the actual number eighty-eight. As a result, the disclosed system would output the corresponding translation (e.g. "BIBI", "bye bye" or the like). Conversely, if the term "88" is detected contained within a string of other Chinese words (characters or transliterations), the disclosed system may determine that no translation should be performed, since the number eighty-eight is more likely what is intended.

To provide such a context checking embodiment, translation specific metadata may be provided in the foreign language abbreviation translation database in association with individual abbreviations (i.e. abbreviation specific context rules for identifying a specific foreign language abbreviation based on term context), or to be applied across all abbreviations (i.e. general abbreviation identification context rules for identifying foreign language abbreviations in general based on term context). Other types of context tests used to determine whether a term is a foreign language abbreviation might include rules based on whether the term is in all capital letters or not. For example, a term that is in all capital letters might be considered more likely to be a foreign language abbreviation than one that is not. Testing based on all capitals would enable a distinction to be made between the abbreviation "CAD" (for "Computer Aided Design") and the English word "cad", e.g. in the case where foreign language abbreviations were being translated from English.

The disclosed system may further provide a user with the ability to add a foreign language abbreviation translation to the foreign language translation database. Such an addition may, for example, be performed through the Graphical User Interface 14 shown in FIG. 1. Adding a new foreign language abbreviation translation to the foreign language abbreviation translation database may be user initiated independent of any instant message or session, or may be the result of the user being automatically prompted to enter a foreign language abbreviation translation when the disclosed system identifies a term that appears to be a foreign language abbreviation, but for which no translation is currently available in the foreign language abbreviation translation database.

Figure 3:
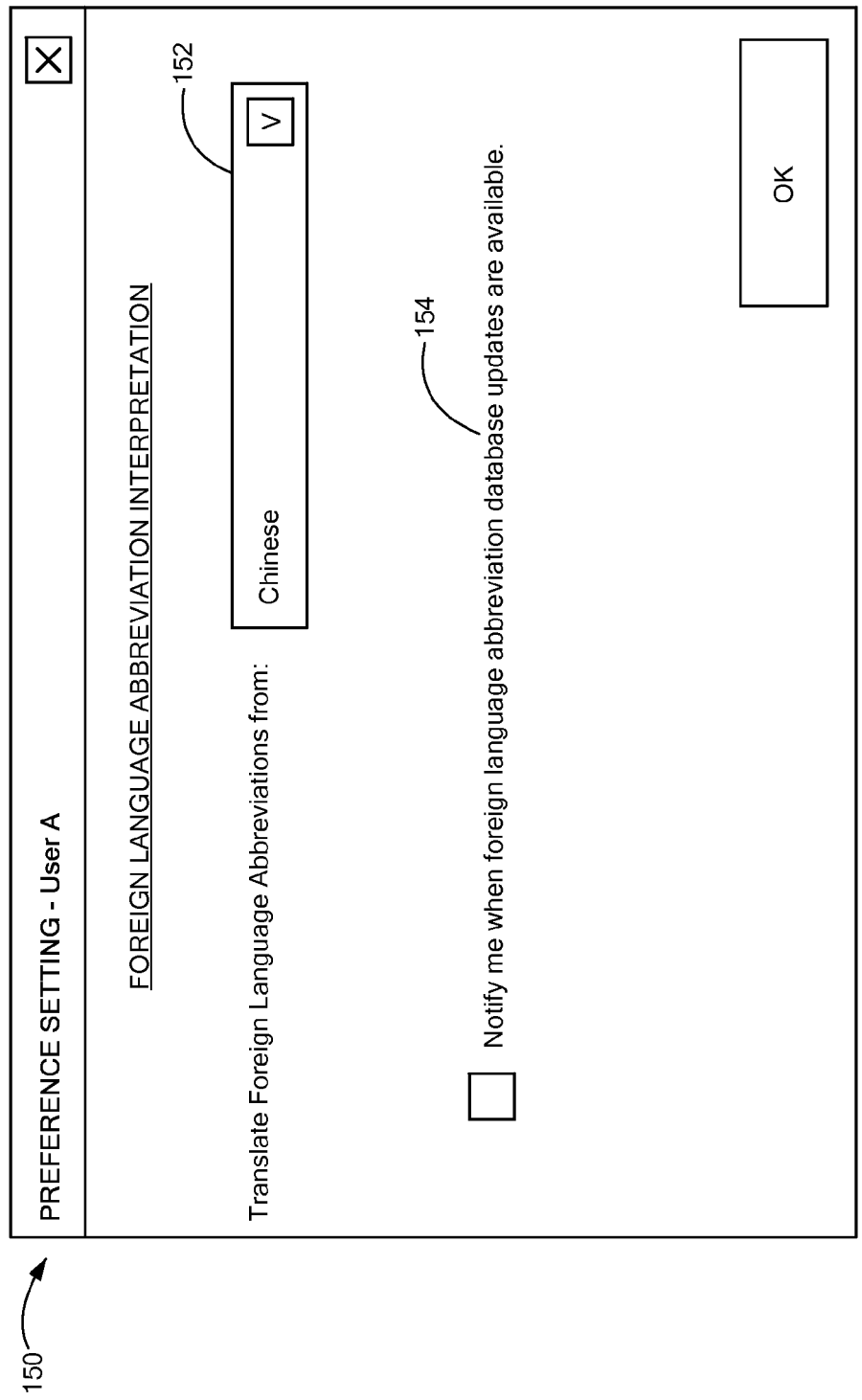
FIG. 3 is a simplified screen shot showing a source culture input user interface object generated during operation of an illustrative embodiment.

FIGS. 3-6 are simplified screen shots illustrating an example of the operation of an embodiment of the disclosed system. In FIG. 3, a simplified screen shot showing a source culture input user interface object 150 generated during operation of an illustrative embodiment. The source culture input user interface object 150 includes a pull down menu 152 from which a user can select a source culture indication to be input the disclosed system, and may further click on a check box 154 to be informed of future updates related to foreign language abbreviation translation (e.g. new or new versions of foreign language abbreviation translation databases). The user interface object 150 may, for example, be generated in response to a user initiating an instant messaging session, as part of a user preferences dialog independent of a specific instant messaging session, or at some other time.

Figure 4:
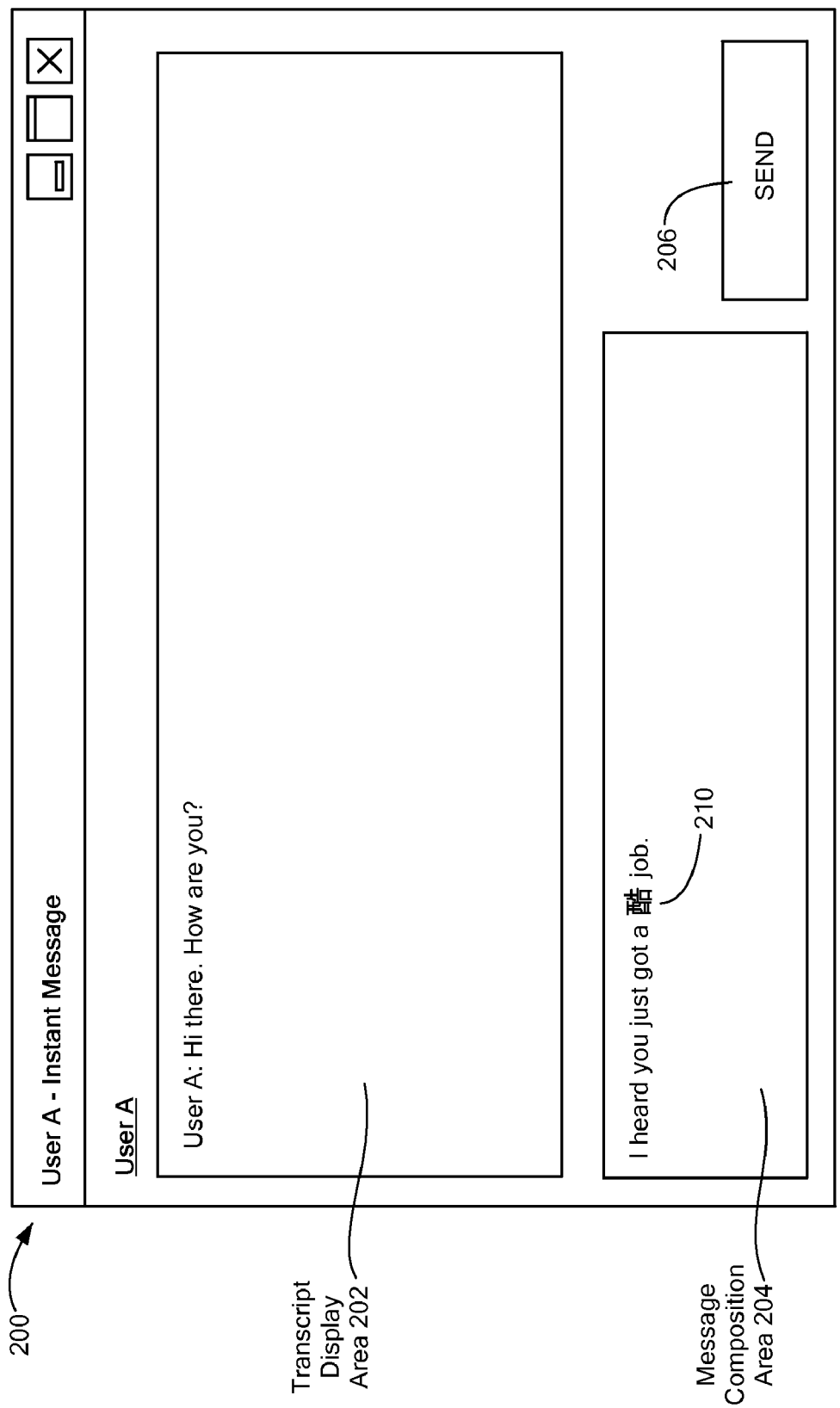
FIG. 4 is a simplified screen shot showing an instant messaging session user interface object as displayed to a first user, and showing input by the first user of an instant message including a foreign language abbreviation.

FIG. 4 is a simplified screen shot showing an instant messaging session user interface object 200 as displayed to a first user ("User A"). The user interface object 200 includes a Transcript Display Area 202 for displaying the transcript of a current instant messaging session, and a Message Composition Area 204, allowing the user to compose an instant message to be added to the transcript when the user clicks on the SEND button 206. In the example of FIG. 4, the user has typed a message into the Message Composition Area 204 including a foreign language abbreviation 210.

Figure 5:
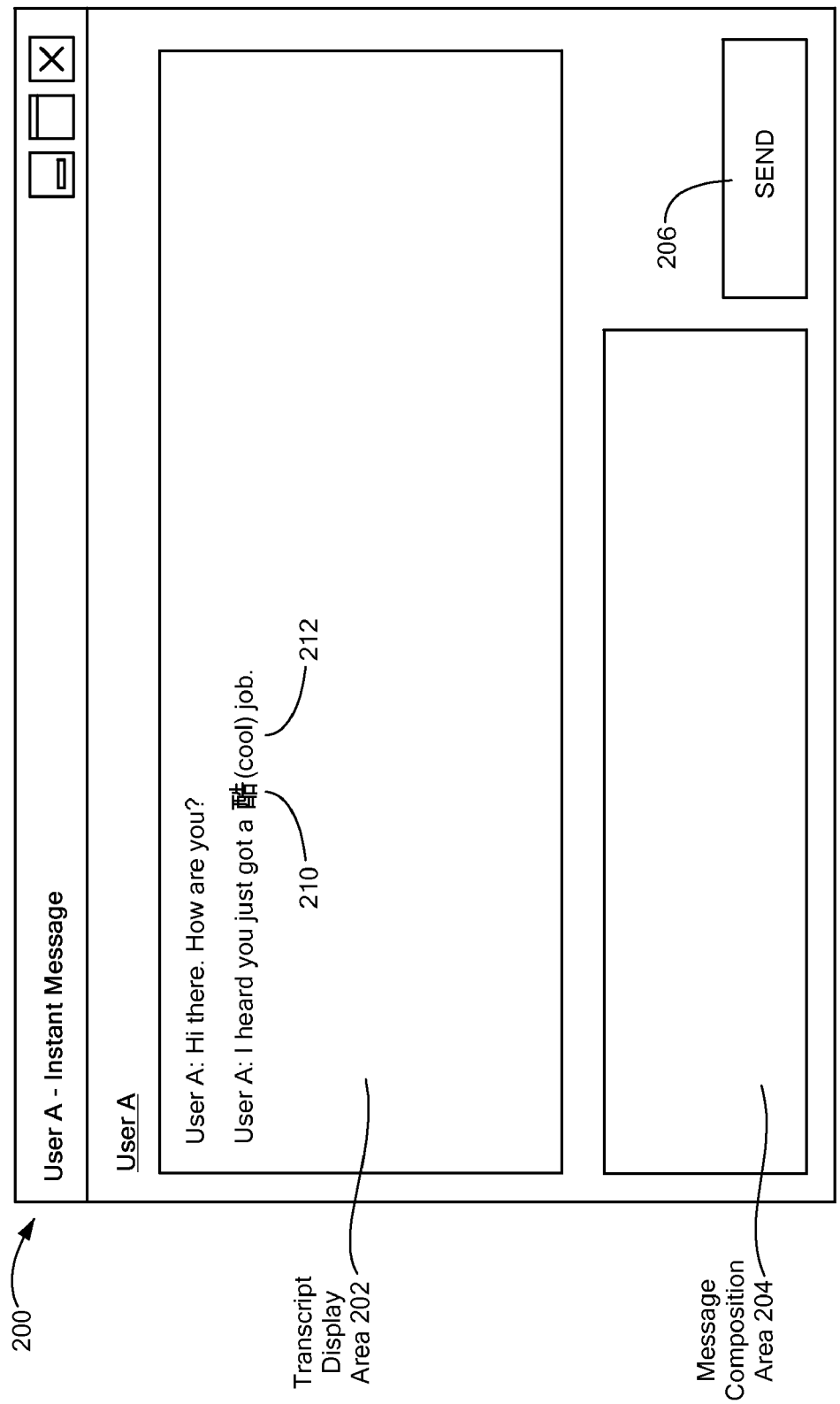
FIG. 5 is a simplified screen shot showing the instant messaging session user interface object of FIG. 4 after the instant message including the foreign language abbreviation has been entered into the instant messaging session, and with the translation of the foreign language abbreviation displayed in the instant messaging session transcript display area.

FIG. 5 is a simplified screen shot showing the instant messaging session user interface object of FIG. 4 after the instant message including the foreign language abbreviation 210 has been entered into the instant messaging session transcript, and with the translation 212 of the foreign language abbreviation 210 displayed in the instant messaging session transcript display area 202.

Figure 6:
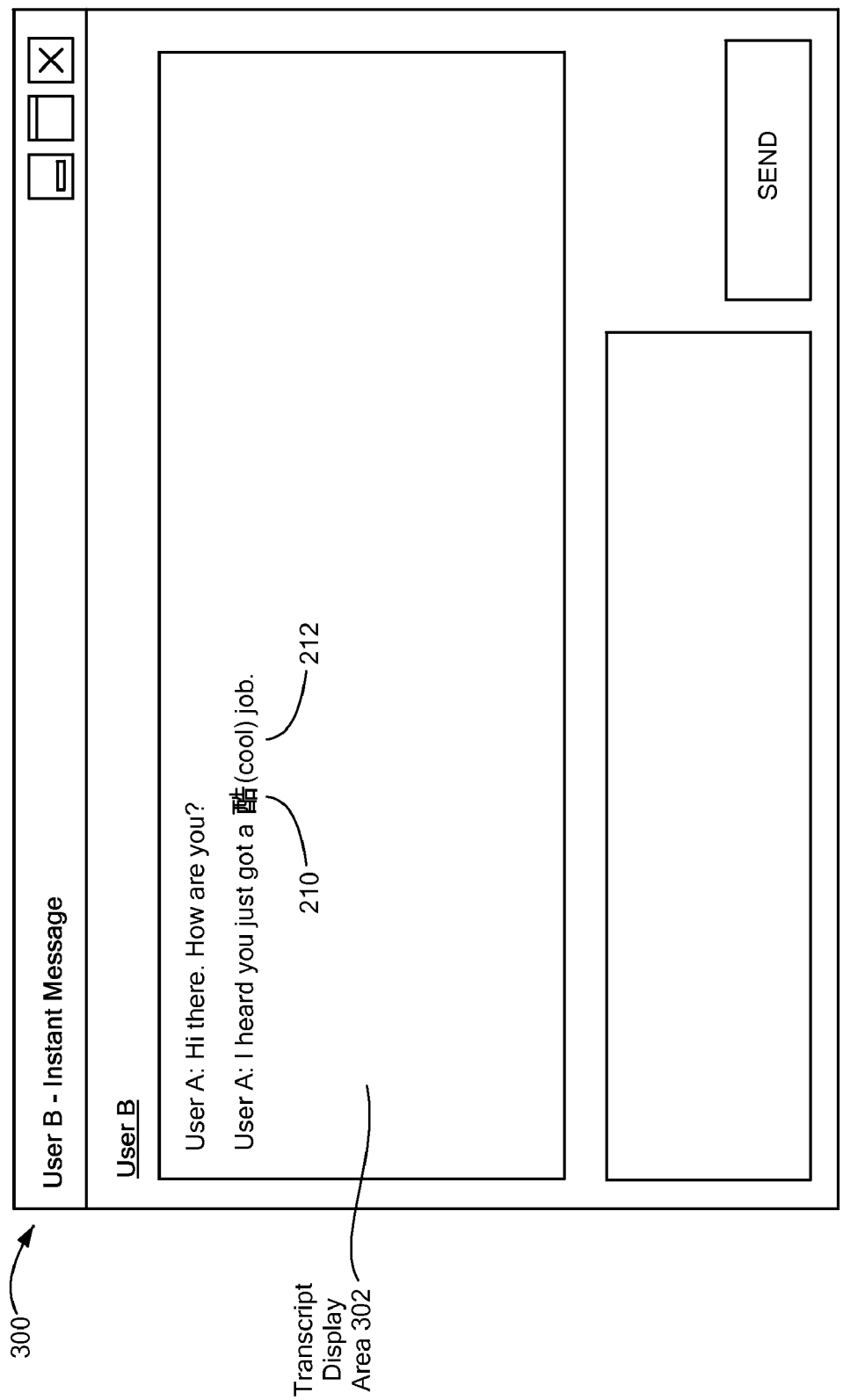
FIG. 6 is a simplified screen shot showing an instant messaging session user interface object displayed to a second user participating in the instant messaging session with the first user of FIG. 5, and displaying the instant message from the first user entered into the instant messaging session transcript display area with the translation of the foreign language abbreviation displayed in the instant messaging session transcript display area.

FIG. 6 is a simplified screen shot showing an instant messaging session user interface object displayed to a second user ("User B") participating in the instant messaging session with the first user of FIG. 5, and displaying the instant message from the first user entered into the instant messaging session transcript display area 302 with the translation 212 of the foreign language abbreviation 210 displayed in the instant messaging session transcript display area 302.

While the above description refers to embodiments of the disclosed system in which an instant message is checked for foreign language abbreviations at the local client computer system of the session participant that entered the instant message, the present invention is not limited to such an embodiment. Accordingly, an alternative embodiment may include checking for foreign language abbreviations in received instant messages, and translating any foreign language abbreviations in such received instant messages at the receiving client computer system. In such an embodiment, different participants would be presented with different session transcripts, reflecting the translations performed by their local client computer systems on foreign language abbreviations located in the instant messages they receive. Alternatively, notifications of such translations of foreign language abbreviations performed on received instant messages could be transmitted to the client systems of other participants in the session, so that such translations could be seen by all session participants. A feature allowing the originator of an instant message to confirm a translation or correct a mis-translation of a foreign language abbreviation in the message may further be provided based on such notifications.

While the above description regarding illustrative embodiments of the disclosed system includes examples of specific user interface operations and/or display objects, such as may be provided using graphical buttons, menus, dialog boxes, and the like, the present invention is not limited to these specific examples. Accordingly, those skilled in the art will recognize that alternative embodiments may use any specific type or kind of user interface display object that may be appropriate to provide the specific operations described. Moreover, while the above examples make reference to translation of Chinese foreign language abbreviations to English, the disclosed system may be embodied and/or configured to handle translation from any source culture to any other language.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for automatically providing foreign language abbreviation translation in an instant messaging system, comprising:
   identifying, by using a computer, at least one foreign language abbreviation translation database in response to a user indicated source culture, wherein said identified foreign abbreviation translation database stores a plurality of abbreviation translations retrievably associated with corresponding ones of a plurality of foreign language abbreviations, wherein said foreign language abbreviations are foreign language abbreviations frequently used by people from said user indicated source culture;
   locating a candidate term that is possibly a foreign language abbreviation in an instant message input from said user;
   comparing said candidate term with said plurality of foreign language abbreviations stored in said identified foreign language abbreviation translation database, wherein said comparing said candidate term with said plurality of foreign language abbreviations includes obtaining a transliteration of said candidate term, said obtaining said transliteration including changing individual characters of said candidate term into characters of an alphabet used to represent said plurality of abbreviation translations to provide a phonetic representation of said candidate term, and comparing said transliteration of said candidate term with said plurality of abbreviation translations;
   in the event that said candidate term matches one of said plurality of foreign language abbreviations stored in said identified foreign language abbreviation translation database, retrieving and displaying one of said plurality of abbreviation translations corresponding to said matching one of said plurality of foreign language abbreviations;
   adding said candidate term to said instant messaging session, wherein said adding is based on said locating, wherein said locating said candidate term that is possibly a foreign language abbreviation in said instant message input from said user is in response to an indication from said user; and
   wherein said displaying said one of said plurality of abbreviation translations corresponding to said matching one of said plurality of foreign language abbreviations is within an instant messaging session graphical user interface.

2. The method of claim 1, further comprising:
   generating a graphical user interface for inputting a user indication of said source culture, wherein said identifying said foreign language abbreviation translation database is responsive to said user indication of said source culture.

3. The method of claim 2, further comprising:
   wherein said locating said candidate term that is possibly a foreign language abbreviation is responsive to a determination that said candidate term is in a foreign language and is not contained in a standard translation database for said foreign language.

4. The method of claim 1, wherein said comparing said candidate term with said plurality of foreign language abbreviations further includes comparing said transliteration of said candidate term with phonetic representations of said plurality of abbreviation translations.

5. The method of claim 1, wherein said candidate term comprises at least one Chinese language character, and wherein said obtaining said transliteration of said candidate term comprises obtaining a roman alphabet version of said candidate term based on a pinyin translation of said at least one Chinese language character.

6. The method of claim 1, wherein said displaying said one of said plurality of abbreviation translations corresponding to said matching one of said plurality of foreign language abbreviations further comprises displaying said one of said plurality of abbreviation translations corresponding to said matching one of said plurality of foreign language abbreviations in parenthesis adjacent to said candidate term.

7. The method of claim 1, wherein said displaying said one of said plurality of abbreviation translations corresponding to said matching one of said plurality of foreign language abbreviations further comprises displaying said one of said plurality of abbreviation translations corresponding to said matching one of said plurality of foreign language abbreviations in place of said candidate term.

8. The method of claim 1, further comprising:
determining that said candidate term does not match any of said foreign language abbreviations stored in said identified foreign language abbreviation translation database; and
in response to said determination that said candidate term does not match any of said foreign language abbreviations stored in said identified foreign language abbreviation translation database, comparing said candidate term to a plurality of foreign language abbreviations stored in another foreign language abbreviation translation database.

9. The method of claim 1, wherein said comparing said candidate term with said plurality of foreign language abbreviations stored in said identified foreign language abbreviation translation database includes generating a digital sound wave representation of how said transliteration of said candidate term sounds, and comparing said digital sound wave representation of how said transliteration of said candidate term sounds with digital sound wave representations of how each of said plurality of foreign language abbreviations stored in said identified foreign language abbreviation translation database sound.

10. A system including a computer readable memory having program code stored thereon, wherein said program code, when executed, causes a computer system to automatically provide foreign language abbreviation translation in an instant messaging system, the system comprising:
foreign language abbreviation translation database identification logic for identifying at least one foreign language abbreviation translation database in response to a user indicated source culture, wherein said identified foreign abbreviation translation database stores a plurality of abbreviation translations retrievably associated with corresponding ones of a plurality of foreign language abbreviations, wherein said foreign language abbreviations are foreign language abbreviations frequently used by people from said user indicated source culture;
candidate term locating logic for locating a candidate term that is possibly a foreign language abbreviation in an instant message input from said user;
comparison logic for comparing said candidate term-said with said plurality of foreign language abbreviations stored in said identified foreign language abbreviation translation database, wherein said comparing said candidate term with said plurality of foreign language abbreviations includes obtaining a transliteration of said candidate term, said obtaining said transliteration including changing individual characters of said candidate term into characters of an alphabet used to represent said plurality of abbreviation translations to provide a phonetic representation of said candidate term, and comparing said transliteration of said candidate term with said plurality of abbreviation translations;
display logic for, in the event that said candidate term matches one of said plurality of foreign language abbreviations stored in said identified foreign language abbreviation translation database, retrieving and displaying one of said plurality of abbreviation translations corresponding to said matching one of said plurality of foreign language abbreviations;
adding said candidate term to said instant messaging session, wherein said adding is based on said locating, wherein said locating said candidate term that is possibly a foreign language abbreviation in said instant message input from said user is in response to an indication from said user; and
wherein said displaying said one of said plurality of abbreviation translations corresponding to said matching one of said plurality of foreign language abbreviations is within an instant messaging session graphical user interface.

11. The system of claim 10, further comprising:
source culture indication user interface generation logic for generating a graphical user interface for inputting a user indication of said source culture, wherein said identifying said foreign language abbreviation translation database is responsive to said user indication of said source culture.

12. The system of claim 11, further comprising:
wherein said locating said candidate term that is possibly a foreign language abbreviation is responsive to a determination that said candidate term is in a foreign language and is not contained in a standard translation database for said foreign language.

13. The system of claim 10, wherein said comparing by said comparison logic of said candidate term with said plurality of foreign language abbreviations further includes comparing said transliteration of said candidate term with phonetic representations of said plurality of abbreviation translations.

14. The system of claim 10, wherein said candidate term comprises at least one Chinese language character, and wherein said obtaining said transliteration of said candidate term by said comparison logic comprises obtaining a roman alphabet version of said candidate term based on a pinyin translation of said at least one Chinese language character.

15. The system of claim 10, wherein said comparing said candidate term with said plurality of foreign language abbreviations stored in said identified foreign language abbreviation translation database by said comparison logic includes generating a digital sound wave representation of how said transliteration of said candidate term sounds, and comparing said digital sound wave representation of how said transliteration of said candidate term sounds with digital sound wave representations of how each of said plurality of foreign language abbreviations stored in said identified foreign language abbreviation translation database sound.

16. A computer program product stored in a computer readable memory having program code stored thereon, wherein said program code, when executed, causes a computer system to automatically provide foreign language abbreviation translation in an instant messaging system, said program code comprising:

program code for identifying at least one foreign language abbreviation translation database in response to a user indicated source culture, wherein said identified foreign abbreviation translation database stores a plurality of abbreviation translations retrievably associated with corresponding ones of a plurality of foreign language abbreviations, wherein said foreign language abbreviations are foreign language abbreviations frequently used by people from said user indicated source culture;

program code for locating a candidate term that is possibly foreign language abbreviation in an instant message input from said user;

program code for comparing said candidate term with said plurality of foreign language abbreviations stored in said identified foreign language abbreviation translation database, wherein said comparing said candidate term with said plurality of foreign language abbreviations includes obtaining a transliteration of said candidate term, said obtaining said transliteration including changing individual characters of said candidate term into characters of an alphabet used to represent said plurality of abbreviation translations to provide a phonetic representation of said candidate term, and comparing said transliteration of said candidate term with said plurality of abbreviation translations;

program code for, in the event that said candidate term matches one of said plurality of foreign language abbreviations stored in said identified foreign language abbreviation translation database, retrieving and displaying one of said plurality of abbreviation translations corresponding to said matching one of said plurality of foreign language abbreviations;

adding said candidate term to said instant messaging session, wherein said adding is based on said locating, wherein said locating said candidate term that is possibly a foreign language abbreviation in said instant message input from said user is in response to an indication from said user; and wherein said displaying said one of said plurality of abbreviation translations corresponding to said matching one of said plurality of foreign language abbreviations is within an instant messaging session graphical user interface.

* * * * *